(12) United States Patent
Jonsson (10) Patent No.: US 6,554,345 B2
(45) Date of Patent: Apr. 29, 2003

(54) LIGHTWEIGHT BEAM

(75) Inventor: Martin Jonsson, Lulea (SE)

(73) Assignee: SSAB Hardtech AB, Lulea (SE)

( * ) Notice: Subject to any disclaimer, the term of this patent is extended or adjusted under 35 U.S.C. 154(b) by 0 days.

(21) Appl. No.: 09/997,414

(22) Filed: Nov. 29, 2001

(65) Prior Publication Data

US 2002/0121797 A1 Sep. 5, 2002

Related U.S. Application Data

(63) Continuation of application No. 09/553,678, filed on Apr. 21, 2000, which is a continuation-in-part of application No. PCT/SE98/01870, filed on Oct. 19, 1998.

(30) Foreign Application Priority Data

Oct. 23, 1997 (SE) .............................................. 9703859

(51) Int. Cl.$^7$ ................................................. B60J 5/00
(52) U.S. Cl. ..................... 296/146.6; 296/149; 52/738.1; 49/501
(58) Field of Search ............................. 296/146.6, 149; 52/738.1; 49/501; 139/383 A (56) References Cited

U.S. PATENT DOCUMENTS

| | | | | |
|---|---|---|---|---|
| 813,175 | A | | 2/1906 | Schaaf et al. |
| 2,775,324 | A | * | 12/1956 | Tate .......................... 52/738.1 |
| 3,868,141 | A | * | 2/1975 | Johnson .................... 296/146.6 |
| 4,090,734 | A | * | 5/1978 | Inami et al. .............. 296/146.6 |
| 4,307,911 | A | * | 12/1981 | Pavlik ....................... 296/146.6 |
| 4,411,103 | A | | 10/1983 | Ohmura et al. |
| 4,599,843 | A | * | 7/1986 | Ingvarsson ................... 49/501 |
| 4,684,166 | A | * | 8/1987 | Kanodia ................... 296/146.6 |
| 4,796,946 | A | * | 1/1989 | Wilson et al. ........... 296/146.6 |
| 4,838,606 | A | * | 6/1989 | Furubayashi et al. .... 296/146.6 |
| 4,919,473 | A | * | 4/1990 | Laimighofer et al. .... 296/146.6 |
| 4,948,196 | A | * | 8/1990 | Baba et al. .................. 296/149 |
| 4,969,680 | A | | 11/1990 | Shimoda |
| 5,080,427 | A | * | 1/1992 | Sturrus et al. ........... 296/146.6 |
| 5,123,694 | A | | 6/1992 | DePierre et al. |
| 5,404,690 | A | | 4/1995 | Hanf |
| 5,600,931 | A | | 2/1997 | Jonsson |
| 5,609,931 | A | * | 3/1997 | Delavallade ............ 139/383 A |
| 5,785,376 | A | * | 7/1998 | Nees et al. ............... 296/146.6 |
| 5,884,960 | A | * | 3/1999 | Wycech .................... 296/146.6 |
| 5,887,938 | A | * | 3/1999 | Topker et al. ........... 296/146.6 |
| 6,096,403 | A | * | 8/2000 | Wycech .................... 296/146.6 |

FOREIGN PATENT DOCUMENTS

SE            509041            11/1998

* cited by examiner

Primary Examiner—Kiran Patel
(74) Attorney, Agent, or Firm—Mark P. Stone (57) ABSTRACT

A motor vehicle impact absorbing beam having, at least along a major part of its length, two flanks (13, 14) having a catenary cross-sectional configuration substantially in the form of a free-hanging chain suspended only at its ends.

7 Claims, 6 Drawing Sheets

LIGHTWEIGHT BEAM

This application is a continuation of U.S. application Ser. No. 09/553,678, filed on Apr. 21, 2000, which is a continuation-in-part of International Patent Application No. PCT/SE98/01870, filed Oct. 19, 1998, which claims priority from Swedish Patent Application No. 9703859-0, filed Oct. 23, 1997. U.S. application Ser. No. 09/553,678 was pending as of the filing date of this application.

FIELD OF INVENTION

The invention relates to a beam that is light in weight.

OBJECT OF INVENTION AND BRIEF DESCRIPTION OF THE INVENTION

It is an object of the invention to provide safety beams that are light in weight and have a high energy absorption capacity.

This object is fulfilled in principle in that the two flanks of the beam have a form in cross section that follows the equation y=cos hyp (x) and the invention has been given the characteristics defined in the claims.

This form of flanks is the form of a free-hanging chain suspended at its ends only (i.e., catenary). With this form of the flanks, there will be no transverse forces on the flanks when there is a load on the beam, but all forces are in the bent plane of the flanks. The beam will therefore withstand greater forces than corresponding conventional beams before its deformation begins and the beam will also absorb more energy than corresponding beams with other flank forms.

The two flanks can meet directly, or alternatively, there can be a central part between the flanks. The flanks can suitably end in side flanges and the side flanges can be coupled together by means of a plurality of coupling elements that can be strips of sheet steel spot welded to the flanges or attached to them in any other way.

Alternatively, a coupling element in the form of a sheet steel cover can be attached to the flanges to give the beam a closed profile. A closed profile can also be achieved by the hydroforming of a closed blank. The beam can be symmetric or asymmetric and its height and width may vary along its length.

The above discussed embodiments of the present invention will be described further hereinbelow with reference to the accompanying figures.

BRIEF DESCRIPTION OF THE DRAWINGS AND DESCRIPTION OF PREFERRED EMBODIMENTS

In the figures, corresponding elements have the same reference numerals.

Figure 1:
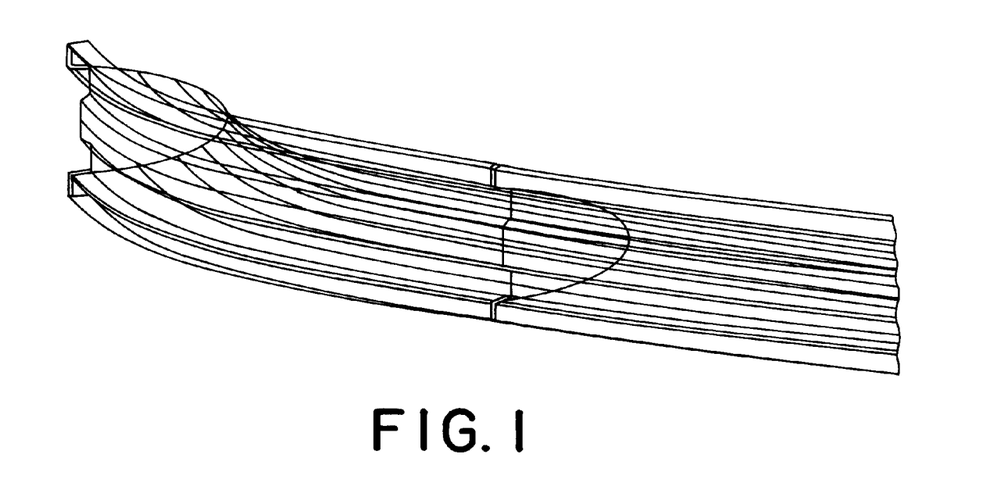
FIG. 1 is a transparent perspective view of the left half of a bumper beam for a front bumper.
Figure 2:
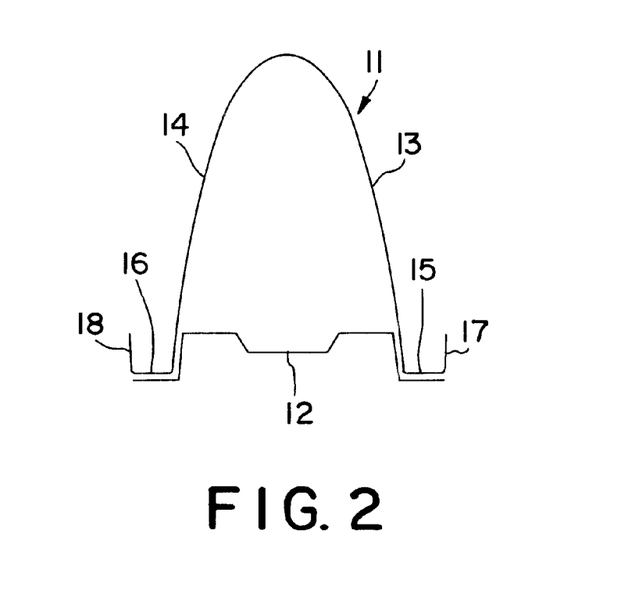
FIG. 2 is a sectional view of the bumper beam shown in FIG. 1.

FIGS. 1 and 2 show the left half of a bow-formed beam for a front bumper. The beam is symmetric both lengthwise and crosswise. It comprises a hat beam 11 with a cover 12. The hat beam 11 has two flanks or webs 13, 14 that meet in the centre line of the beam, and the flanks end in side flanges 15, 16 with upstanding edges 17, 18. The cover 12 is fixed to the flanges 15, 16 preferably by spot welding. The cover 12 can be flat but it is shown having stiffening grooves and creases.

The two flanks 13, 14 have a cross sectional form that is catenary in configuration corresponding to the equation y=cos hyp (x), that is $$y = k \cdot \frac{e^x + e^{-x}}{2}$$

in which k is a scale factor. The two flanks 13, 14 will together have the form of a free-hanging chain suspended at its two ends only (i.e., catenary), and all forces will therefore be in the bent plane of the flanks when the beam is subject to a symmetrical load. Thus, there will be no forces transverse to the flanks, and the beam will therefore withstand greater forces than corresponding beams with other flank forms before the deformation starts. The beam will also absorb more energy during deformation than corresponding beams with other flank forms.

Figure 3:
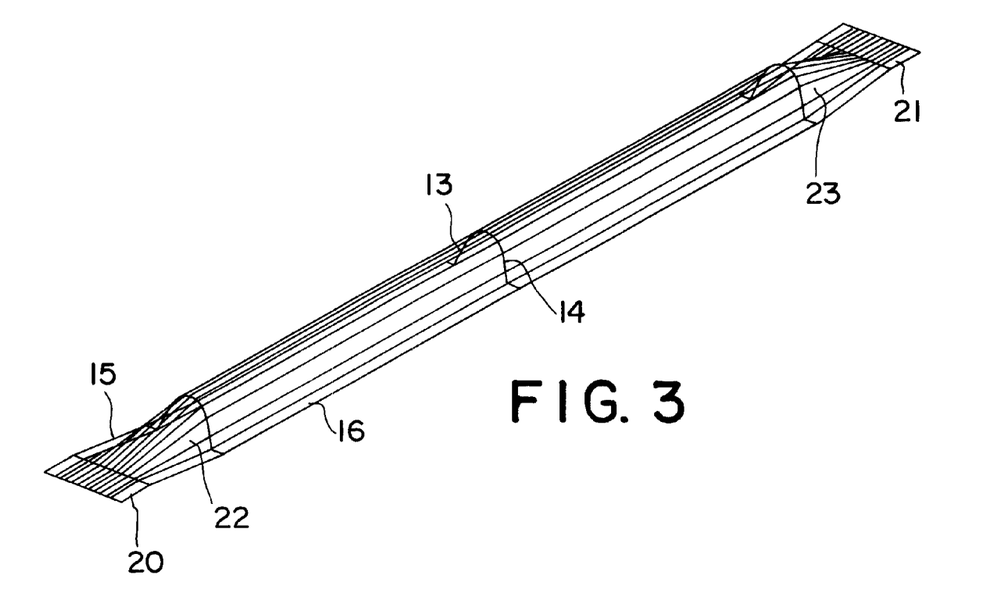
FIG. 3 is a transparent perspective view of a safety beam for an automobile door.

FIG. 3 shows an open hat beam intended for use as a side impact beam in a door of a passenger car. It has a central section comprising two flanks 13, 14 with the form of a chain described above and two side flanges 15, 16. It has mounting sections in the form of flat end portions 20, 21 and transition sections 22, 23 between the central section and the end portions. The central section has a constant cross section over its length. Alternatively, it may have a constant height but continuously varying width along its length, which means that the scale factor k varies in the equation above. In the same way, a beam may have a constant width and varying height and still, the flanks can have this form of a chain along their length. Both the height and the width may also vary. The beam 11 may be symmetric or asymmetric lengthwise. The hat beam 11 is primarily intended to be mounted with its top outwardly directed so that the top of it will be hit in a collision.

Figure 4:
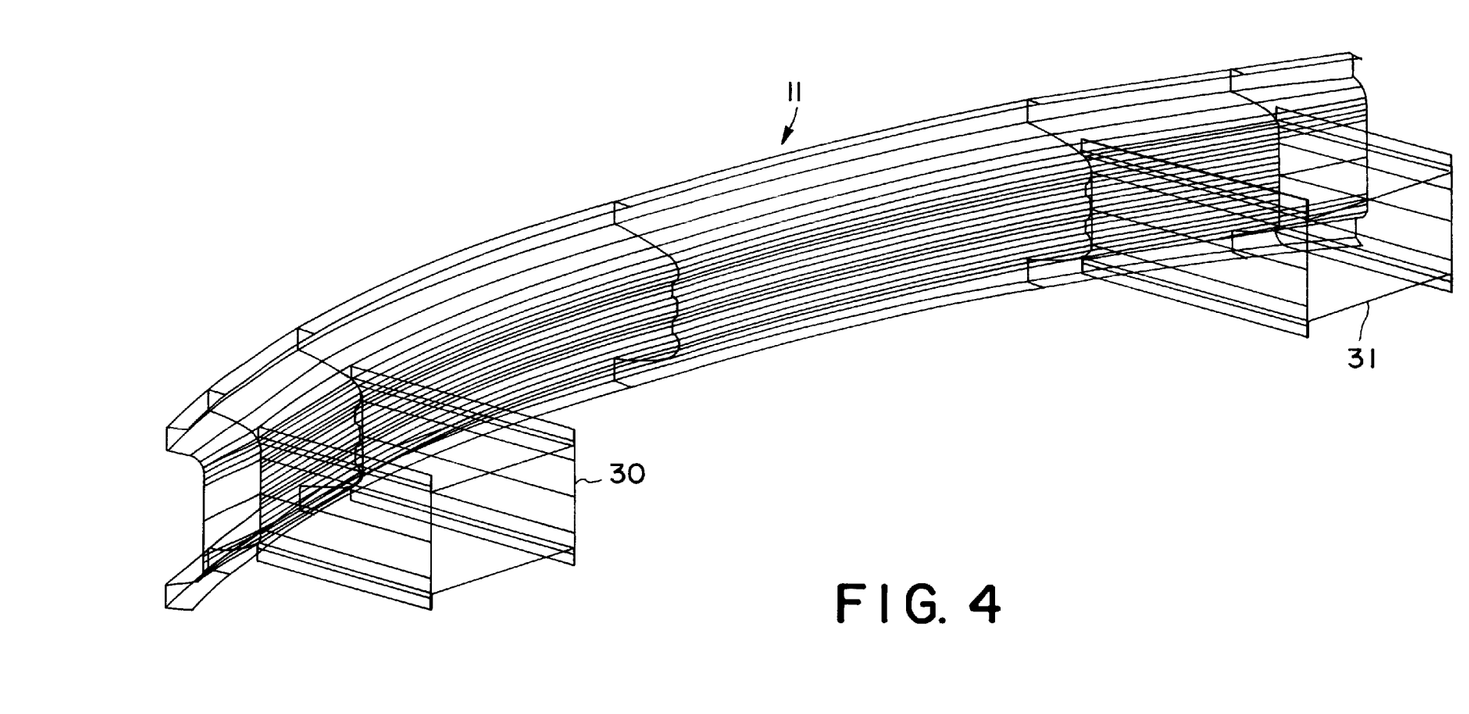
FIG. 4 is a transparent perspective view of the bumper beam of a front bumper and part of the side beams of an automobile.

FIG. 4 shows a bow-formed bumper beam in the form of a hat beam 11 fastened to the side beams 30, 31 of an automobile. The beam is shown as an open profile, but it may also have a cover like the beam in the FIGS. 1 and 2. The two flanks of the beam 11 has the same chain form as the flanks of the beams in FIGS. 1 and 2 and the flanks of the beam in FIG. 3. The two flanks do not meet directly but they are separated by a central part as will be described later with reference to FIG. 6.

The bumper beam 11 takes support against the vertical sides of the side beams 30, 31 and the horizontal parts of the side beams extend as flaps along the flanks of the bumper beam 11 and have been fixed to them by spot welding. The vertical sides of the side beams 30, 31 may have outwardly bent ends that have been fixed to the top of the beam by spot welding. The ends of the hat beam may have continuously decreasing height as shown so that the side beams of the vehicle can be somewhat longer, which improves the energy absorption capacity of the side beams more than it reduces the energy absorption capacity of the bumper beam. The flanks of the bumper beam may maintain their form all the way to their ends but their ends may have a different design.

Figure 5:
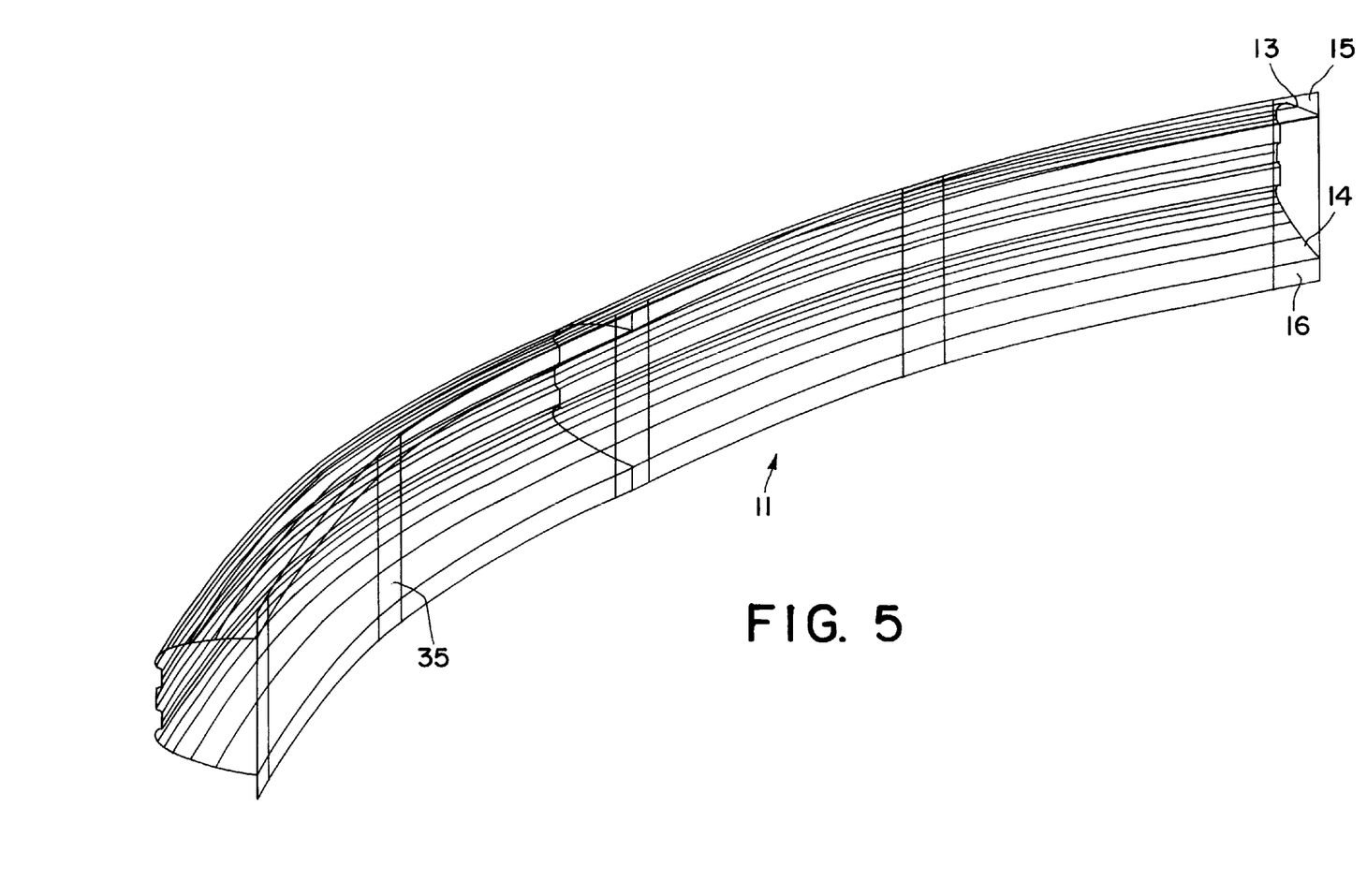
FIG. 5 is a transparent perspective view of another bumper beam.

FIG. 5 shows another bumper beam 11 in accordance with the invention. It has its top directed outwardly and a plurality of sheet steel strips 35 that couple the flanges 15, 16 together as an alternative to a complete cover of the kind shown in FIGS. 1 and 2. The strips 35 are fixed to the flanges 15, 16 by being welded thereto, suitably by spot welding.

Figure 6:
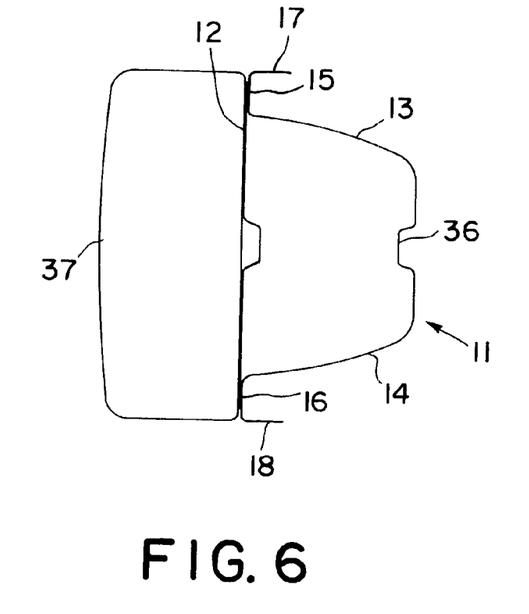
FIG. 6 is a sectional view of a bumper with a bumper beam of the kind shown in FIG. 4, but not exactly the same one as in FIG. 4.

FIG. 6 is a transverse section through a bumper beam of the kind shown in FIG. 4. It comprises a hat beam 11 with two flanks 13, 14 that end in side flanges 15, 16 with upwardly bent edges 17, 18. A cover 12 is spot welded to the flanges 15, 16. The two flanks 13, 14 have the described form of a free hanging chain and they are separated by an intermediate part 36. An energy absorbent material 37 in the form of a stiff foam, for example a polyurethane foam, is attached to the cover 12 by being cemented thereto and the foam and the bumper beam form together the bumper. The bumper is to be mounted with the foam outwardly directed.

Figure 7:
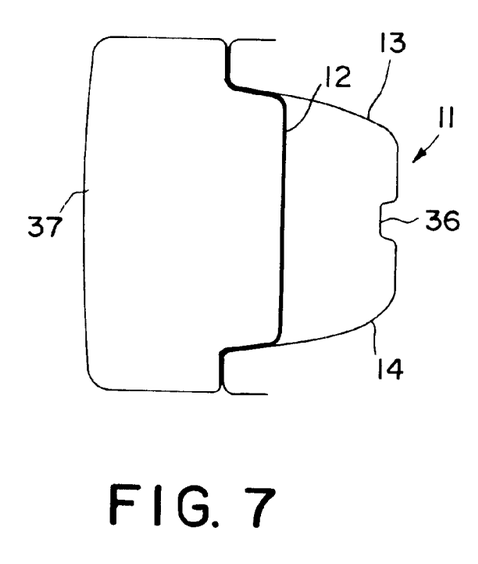
FIG. 7 is a sectional view of a bumper with one more example of a bumper beam of the kind shown in FIG. 4.

FIG. 7 shows a bumper slightly modified from the one on FIG. 6. The difference is that the cover 12 has the form of a hat beam and extends into the hat beam 11.

Figure 8:
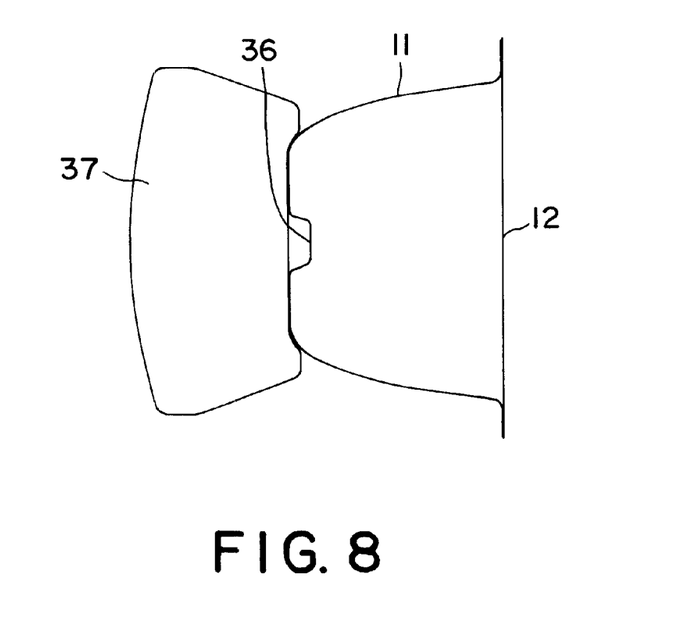
FIG. 8 is a sectional view of a bumper beam of the kind shown in FIG. 5, but not exactly the one in FIG. 5.

FIG. 8 shows in a transverse section a bumper beam of the kind shown in FIG. 5, namely a beam which has its top outwardly directed and its cover adjacent the vehicle. The foam 37 is attached to the top of the hat beam, that is, attached to the intermediate part 36.

Figure 9:
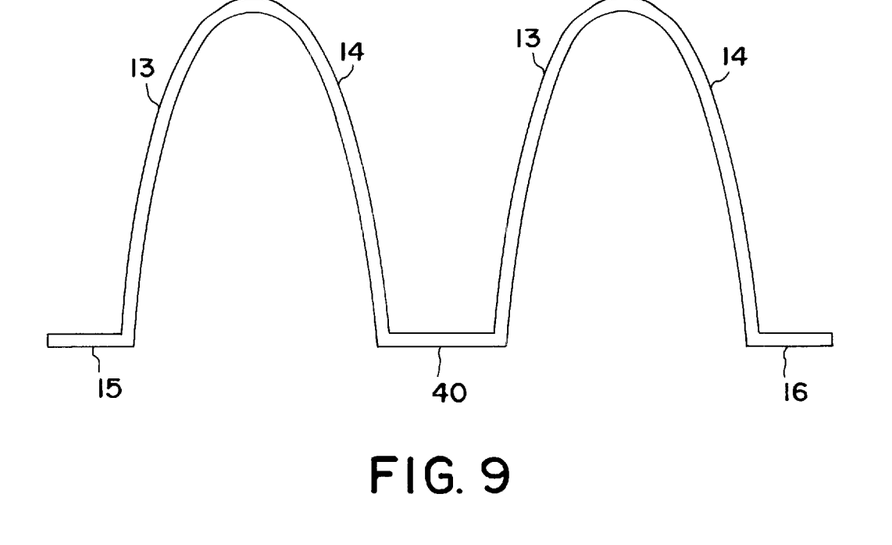
FIG. 9 is a sectional view of a beam of the kind shown in FIG. 3, but it is doubled.

Any beam of the kind described can be multiplied as shown in FIG. 9. In this Figure, two beams of the kind shown in FIG. 3 are integrated and they have one of their side flanges, flange 40, in common.

Figure 10:
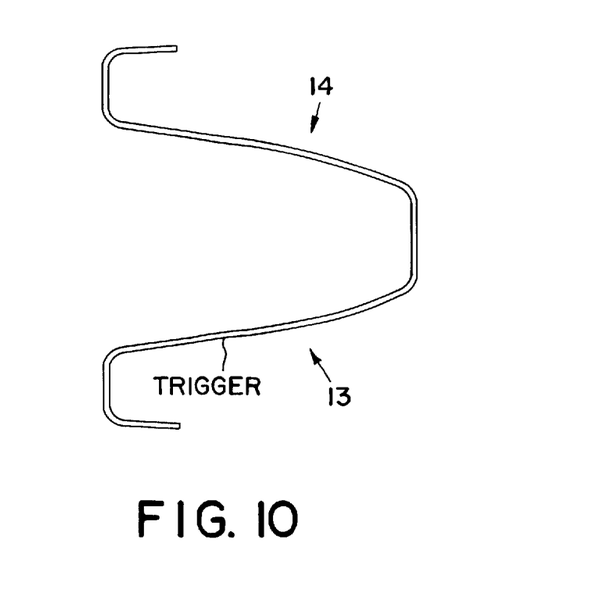
FIG. 10 is a sectional view of a beam according to at least one embodiment of the present invention having a top surface and a trigger portion.

FIG. 10 shows a beam according to at least one embodiment of the present invention. The beam comprises a guide or trigger portion which permits folding of the beam. The trigger portion is in the form of an irregularity located at approximately one-third the height of the beam. The flanks (13, 14) can have a cosinus hyperbolicus form both below and above the trigger portion.

One feature of the invention resides broadly in the beam for a vehicle, characterized in that, at least along a major part of its length, the beam comprises two flanks (13, 14) with a catenary form in cross section tht follows substantially the equation y=k·cos hyp (x).

Another feature of the invention resides broadly in the beam characterized in that the two flanks (13, 14) meet directly. Yet another feature of the invention resides broadly in the beam characterized by a central portion (36) between the two flanks (13, 14).

Still another feature of the invention resides broadly in the beam characterized in that the flanks (13, 14) end with side flanges (15, 16).

A further feature of the invention resides broadly in the beam characterized in that the side flanges (15, 16) have upstanding edges (17, 18).

Another feature of the invention resides broadly in the beam characterized in that it has a closed cross section.

Yet another feature of the invention resides broadly in the beam characterized by elements (12, 35) coupling the two side flanges (15, 16) together.

Still another feature of the invention resides broadly in the beam characterized in that said coupling elements comprises a plate (12) that gives the beam a closed cross section.

A further feature of the invention resides broadly in the beam characterized in that it is made of stamped and hardened steel sheet.

Another feature of the invention resides broadly in the use of a safety beam as a side impact beam in an automotive vehicle, the beam having an open cross section and its top directed outwardly.

This invention further relates to a beam for a vehicle and in particular it relates to a safety beam. Safety beams are used for example as side impact beams or bumper beams in automotive vehicles. Today, one strives to make motor vehicles and especially passenger cars as lightweight as possible, and the safety beams should therefore be as lightweight as possible and still meet the demand for increased energy absorption capacity. The invention also relates to a beam for a vehicle, for example a bumper beam or a safety beam in a car door, that has the form of a hat beam. Its webs or flanks have a form that follows substantially the equation y=cos hyp (x), that is, the form a chain will have when suspended at its two ends (i.e. catenary). As a result of this flank form of the beams, the flanks will not be subjected to any forces transverse to them until they begin to deform when subjected to an external load in a collision. The beam can therefore take up greater forces before being deformed than beams with other flank forms.

Examples of vehicle pillars which may be used in conjunction with embodiments of the present invention, may be found in the following U.S. Patents which are hereby incorporated by reference as if set forth in their entirety herein: U.S. Pat. No. 5,954,390, issued Sep. 21, 1999 to Kleinhoffer et al.; U.S. Pat. No. 5,718,451, issued Feb. 17, 1998 to White; U.S. Pat. No. 5,968,614, issued Oct. 19, 1999 to Reichenberger et al.; U.S. Pat. No. 5,855,407, issued Jan. 5, 1999 to Fukuda; U.S. Pat. No. 5,720,510, issued Feb. 24, 1998 to Daniel et al.; U.S. Pat. No. 5,609,385, issued Mar. 11, 1997 to Daniel et al.; U.S. Pat. No. 5,544,933, issued Aug. 13, 1996 to Shahab et al.; U.S. Pat. No. 5,382,071, issued Jan. 17, 1995 to Enning et al.; U.S. Pat. No. 5,094, 504, issued Mar. 10, 1992 to Wurl; U.S. Pat. No. 5,046,778, issued Sep. 10, 1991 to Larsen; U.S. Pat. No. 4,971,359, issued Nov. 20, 1990 to Takahashi et al.; U.S. Pat. No. 4,736,981, issued Apr. 12, 1988 to Barton et al.; and U.S. Pat. No. 4,355,843, issued Oct. 26, 1982 to Murakami.

The following U.S. patent applications are hereby incorporated by reference as if set forth in their entirety herein: U.S. patent application Ser. No. 09/164,848, filed on Oct. 1, 1998, having inventors Hortlund and Sandberg, entitled "Structural Beam for Supporting and Reinforcing a Structure"; and U.S. patent application Ser. No. 09/457,978, filed on Dec. 9, 1999, having inventor Jonsson, entitled "A Pillar for a Vehicle Body."

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The following patents, patent applications, or patent publications, which were cited in the International Preliminary Examination Report dated Sep. 22, 1999, and/or cited elsewhere, are hereby incorporated by reference as if set forth in their entirety herein as follows: German Patent Application No. DE 196 10 143, dated Sep. 18, 1997; U.S. Pat. No. 5,080,410, dated Jan. 14, 1992; International Patent No. WO 9520506, dated Aug. 3, 1995; and International Patent No. WO 9407709, dated Apr. 14, 1994.

The corresponding foreign and international patent publication applications, namely, Swedish Patent Application No. 9703859-0, filed on Oct. 23, 1997, having inventor Martin Jonsson, and Laid-Open published Swedish Patent Application corresponding to Swedish Patent Application No. 9703859-0, filed on Oct. 23, 1997, having inventor Martin Jonsson, and the Swedish Patent issuing from Swedish Patent Application No. 9703859-0, filed on Oct. 23, 1997, having inventor Martin Jonsson, and International Application No. PCT/SE98/01870, filed on Oct. 19, 1998, corresponding to the present application, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

Examples of safety bars, and components thereof, which may be used in conjunction with embodiments of the present invention, may be found in the following U.S. Patents, which are hereby incorporated by reference as if set forth in their entirety herein: U.S. Pat. No. 4,641,872, issued Feb. 10, 1987 to Lohr et al.; U.S. Pat. No. 5,093,990, issued Mar. 10, 1992 to Klippel; U.S. Pat. No. 5,277,469, issued Jan. 11, 1994 to Klippel.; U.S. Pat. No. 5,125,251, issued Jun. 30, 1992 to Pettersson et al.; and U.S. Pat. No. 5,256,219, issued Oct. 26, 1993 to von Hagen et al.

The following patents are hereby incorporated by reference as if set forth in their entirety herein: U.S. Pat. No. 4,682,812; European Pat. No. EP 07 60 329; French Patent No. FR 75 62 86; and European Patent No. EP 07 53 450.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses, if any, are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A motor vehicle impact absorbing beam, characterised in that, at least along a major part of its length, the beam comprises two flanks (13, 14) and has a cross-sectional form which is catenary in configuration, corresponding substantially to the form of a free-hanging chain suspended at its ends only.

2. The beam according to claim 1, characterised in that the two flanks (13, 14) meet directly.

3. A beam according to claim 1, characterised in that the flanks (13, 14) end with side flanges (15, 16).

4. A beam according to claim 3, characterised in that the side flanges (15, 16) have upstanding edges (17, 18).

5. A beam according to claim 1, characterised in that it has a closed cross section.

6. The beam according to claim 3, characterised in that coupling elements (12, 35) couple the two side flanges (15, 16) together, and that said coupling elements comprise a plate (12) that gives the beam a closed cross section.

7. The beam according to claim 1, characterised in that said beam is formed from a stamped and hardened steel sheet.

* * * * *

UNITED STATES PATENT AND TRADEMARK OFFICE
CERTIFICATE OF CORRECTION

PATENT NO. : 6,554,345 B2
DATED : April 29, 2003
INVENTOR(S) : Martin Jonsson

It is certified that error appears in the above-identified patent and that said Letters Patent is hereby corrected as shown below:

<u>Column 4, line 28 through Column 6, line 3,</u>
Delete in its entirety.

<u>Column 6,</u>
Line 30, delete "A" and substitute -- The --;
Line 32, delete "A" and substitute -- The --;
Line 34, delete "A" and substitute -- The --; and
Line 34, delete "it" and substitute -- said beam --.

Signed and Sealed this

Nineteenth Day of August, 2003

JAMES E. ROGAN
*Director of the United States Patent and Trademark Office*